US012086197B2

(12) United States Patent
Davis (10) Patent No.: US 12,086,197 B2
(45) Date of Patent: Sep. 10, 2024

(54) METHODS AND APPARATUS FOR PROCESSING, SEARCHING AND DISPLAYING PDF DOCUMENTS USING A BROWSER

(71) Applicant: Accusoft Corporation, Tampa, FL (US)

(72) Inventor: Charlie Davis, Tampa, FL (US)

(73) Assignee: Accusoft Corporation, Tampa, FL (US)

( * ) Notice: Subject to any disclaimer, the term of this patent is extended or adjusted under 35 U.S.C. 154(b) by 462 days.

(21) Appl. No.: 17/515,251

(22) Filed: Oct. 29, 2021

(65) Prior Publication Data

US 2023/0135829 A1    May 4, 2023

(51) Int. Cl.
G06F 16/9538    (2019.01)
G06F 9/48    (2006.01)
G06F 16/93    (2019.01)
G06F 40/106    (2020.01)

(52) U.S. Cl.
CPC ........ *G06F 16/9538* (2019.01); *G06F 9/4881* (2013.01); *G06F 16/93* (2019.01); *G06F 40/106* (2020.01)

(58) Field of Classification Search
None
See application file for complete search history.

(56) References Cited

U.S. PATENT DOCUMENTS

2019/0065502 A1*  2/2019  Lee ..................... G06F 16/951
2020/0175021 A1*  6/2020  Eifert .................... G16H 50/70
2023/0161943 A1*  5/2023  Morariu ............... G06F 40/106
                                                           715/243

* cited by examiner

*Primary Examiner* — Toan H Vu
(74) *Attorney, Agent, or Firm* — Straub & Straub; Michael P. Straub; Stephen T. Straub (57) ABSTRACT

Methods and apparatus for retrieving PDF documents, performing text extraction operations on portions or all of a retrieved document and supporting search operations in a manner that allows search results to be quickly provided for at least portions of a PDF document being viewed are described. The methods and apparatus are particularly useful in applications, such as many applications executed by a browser, where the application is limited to a single processing thread and thus must perform all or many processing operations sequentially. By prioritizing document pages which are being viewed for text extraction even before a search is initiated and by performing text extraction in small periods of time and storing the results, in many cases a user can be provided with text search results for a page being viewed in relatively little time and without the program, e.g., java script browser application, appearing non-responsive.

24 Claims, 8 Drawing Sheets

EXEMPLARY TEXT REPOSITORY DATA STRUCTURE INCLUDING
TEXT RETRIEVAL RESULTS

// a. n - 1 length Array where each index corresponds to a page within the document
[
  {
    status: 'pending' || 'complete' || 'error',
    pageText: text string containing the entirety of a pages orthographical text,
    text: [
      {
        items: [
          {
            height: height of the text run,
            str: String containing the string of text,
            totalPageTextStringStartPosition: position at which this particular text string begins within the page text string,
            width: width of the text run
          },
          ...
        ]
      },
      ...
    ]
  },
  ...
]

METHODS AND APPARATUS FOR PROCESSING, SEARCHING AND DISPLAYING PDF DOCUMENTS USING A BROWSER

FIELD

The present application relates to document retrieval, processing and/or searching and more particularly to the retrieval and processing of PDF documents using a web browser or other application which supports single thread processing.

BACKGROUND

Portable Document Format (PDF), standardized as ISO 32000, is a file format that was used to represent documents. PDF documents often include a combination of text, glyphs and/or images. While text may be included in a PDF document it is often included as a set of references to text works and/or characters with information about where on a page the text is to be positioned for display. In cases where text is represented in image format in a PDF document it may be necessary to perform an OCR operation to recover text.

Regardless of how text is included in a PDF document, it normally needs to be extracted prior to being easily searched in a web browser. Various applications or function calls can be used to extract text from a PDF document. PDF viewing applications implemented in web browsers are often limited to being a single thread application. Accordingly, multi-thread processing which allows for true parallel processing as part of an application is normally not available for browser based applications, e.g., applications implemented in Java script.

In the case of a single thread application, a call to a data extraction routine to extract the full text of a PDF document to support search functions can result in processing of the PDF document for a considerable amount of time before a search can even begin. This can have the affect of the user who is initiating a search having the feeling that the browser application has hung and is not responding. This can result to a very poor user experience with a user often abandoning a search before it completes out of frustration over waiting while data extraction is performed.

The accessing, displaying and searching of PDF documents is a technical computer related problem since it is computer implemented and relates to how documents in a digital format are accessed and processed by a user. Prioritization of tasks and effective use of processing resources, particularly in the context where a single processing thread such as that supported by a JAVA script application implemented by a browser, is a technical aspect associated with implementing such a browser based PDF document viewer.

Since web browsers are often used for accessing document content, e.g., via the Internet, it would be desirable if methods and apparatus could be developed which would allow a user to access PDF documents using a web browser, initiate a search and receive at least some search results without excessive delays or a poor user experience which can occur if the user has to wait a significant amount of time for search results to be presented.

SUMMARY

Methods and apparatus for retrieving PDF based documents, displaying one or more pages of PDF documents, extracting text from such documents to support searching and the displaying of search results are described.

In at least some embodiments a JAVA script application implemented by a Web browser is used to support PDF document retrieval, display and searching. In at least some such embodiments the JAVA script application used to support PDF document viewing and searching is a single thread application which prioritizes different processing operations and performs them in such a way that a user using the Web browser does not encounter excessive delays when performing a word search in a PDF document which has been retrieved and a portion of which is being displayed.

The inventor of the present application recognized that a large part of the unsatisfactory user experience associated with many PDF search applications related to the delay of the application initiating the search extracting text from all or a very large portion of a document to be searched prior to providing any search results and/or while precluding the user from performing other operations such as scrolling through document pages or jumping between pages once a search was initiated and before the full set of search results were obtained. Such limitations on web browser based applications is due in some cases to the single processing thread limitation which interferes with the user having the web browser perform scrolling or other operations while the text extraction and/or search is ongoing.

In accordance with the present invention, in at least some embodiments, text extraction is performed in relatively small units of time, e.g., for less than 200 ms, before the application handling PDF document display and searching considers switching to another higher priority processing operation. By limiting text extraction to relatively small periods of time and prioritizing which text is extracted to support searching at a given time, PDF document searching is supported using a single thread application without significantly interference with other processes or operations such as scrolling through text or switching between pages of a PDF document being viewed.

Two hundred (200) ms is as an upper threshold for continuous text extraction processing is based on the observation that a user may begin to sense that an application is being non-responsive or jumpy when a delay longer than that occurs between a user providing an input and an action being taken which is observable to the user. In various embodiments the continuous text extraction process is limited to 100 ms and in some cases to 50 ms before other processing is considered for implementation.

In addition to the need to appear responsive to a user's input, it was recognized that a user is often most interested in the page or pages he is viewing and often is seeking prompt identification of words being searched on the page or pages being displayed.

To facilitate providing of rapid search results, text extraction to support searching is prioritized based on what page or pages a user is viewing at a given time. Similarly, document pages are for search purposes based on what page or pages a user is viewing at given time, e.g., the time the search is initiated and/or during an ongoing search.

In some embodiments when processing resources are not being used for a particular function and are available, the text extraction process is given priority and is allowed to use the available processing resources for a fixed period of time, e.g., 50 ms, before reallocation of the processing resources to another application or function are considered. During this period of time text from a portion of a page or multiple pages can be extracted. Given the short amount of time dedicated for text extraction the use of the resources does not noticeably interfere with a user's ability to use the processing resources for another operation such as page scrolling since the delay in responding to a user's input will be relatively small even though the processing relating to scrolling will have to wait for the text extraction to complete before it can be implemented in the single processing thread application.

Pages are prioritized for text extraction purposes with priority given to i) the lowest number page being displayed for which text has not already been fully extracted, followed in terms of priority by: ii) the next lowest number page (or pages) being displayed for which text has not already been fully extracted followed by: iii) the lowest number page of the document for which text has not already been fully extracted. As should be appreciated as a user changes the page or pages being viewed, the text extraction priority of the pages may and often will change. By prioritizing document pages being viewed for text extraction, and by performing text extraction in some cases to obtain text which can be stored in an easily searchable data structure or database, even before a search is requested, the amount of time between when a user initiates a search and is provided search results at least for the page or pages being viewed can be greatly reduced as to other approaches which require extraction of text from the entire document before search results are presented to a user.

Document searching operations based on already extracted text take less processing resources in many cases than text extraction. Searching of previously extracted portions of text corresponding to a page or pages being viewed is given priority over additional text extraction. Accordingly, when text corresponding to a portion of a page was previously extracted, initiation of a search will cause the previously extracted text to be searched and the results corresponding to the page(s) being viewed to be provided prior to proceeding with further text extraction. This provides a user with very quick search results in cases where a portion or all of the pages being viewed were already subject to text extraction.

While in cases where text extraction was not previously completed for all the pages being viewed, being able to quickly provide a user with at least search results for a portion of the page or pages being viewed can be a highly desirable result from a user experience perspective since the user is provide at least some results to consider in such a case while the additional portions of the document are processed, and the additional search results displayed as they are obtained.

Extracted text is stored in an easily searched data structure, e.g., an indexed data structure which is well suited for searching in some embodiments. The extracted text can be, and is, easily updated as text corresponding to a portion of a page, an entire page or multiple pages is obtained from the processing performed in the limited duration text extraction processing period used in some embodiments.

Given that the text extraction is performed in small units corresponding to relatively small periods of time, they can be performed in a manner that is relatively transparent to a user and which support the provision of rapid search results without introducing long delays between a user initiating a operation and a response to an operation being provided.

Given prioritization in regard to extraction of text to pages being viewed when performing text extraction processing and giving similar priority to pages to be searched when implementing a search allows search results to be obtained and provided in a quick and user friendly manner.

The text extraction can be implemented by a call to one or more known PDF text extraction applications or functions. In some embodiments text extraction is achieved by making a function call to a PDF.JS function or application where PDF.JS is a general-purpose, web standards-based platform and function library for parsing PDFs that was developed as a Mozilla Foundation project.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE INVENTION

Figure 1:
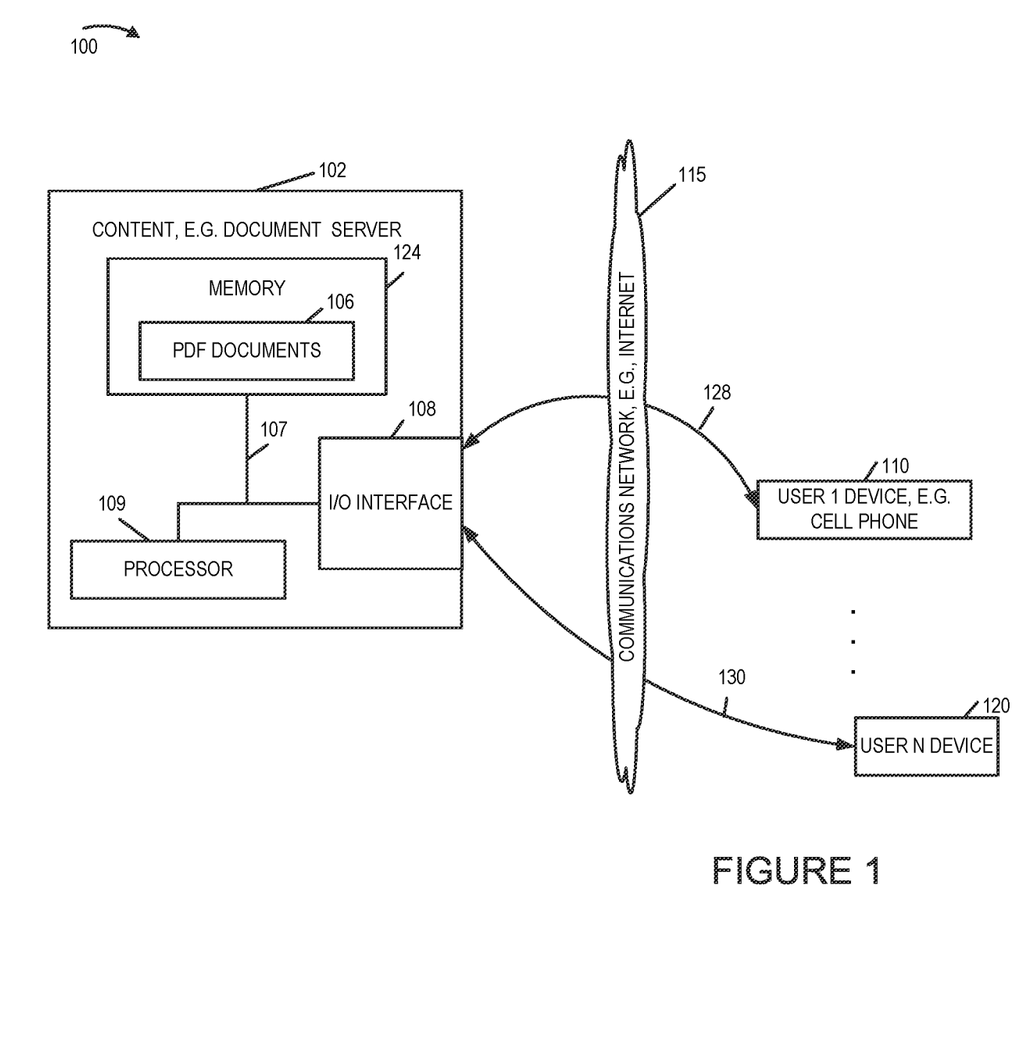
FIG. 1 is a drawing of an exemplary system in accordance with one exemplary embodiment.

FIG. 1 is a drawing of an exemplary system 100 implemented in accordance with one exemplary embodiment. The system 100 includes a content, e.g., document server 102 which is coupled to user devices 110, 120 via a communications network 115 which may be the Internet. The document server 102 includes a memory 124 which includes a plurality of PDF documents 106 that are supplied upon request to one or more of the user devices 110, 120. The memory 124 is coupled by bus 107 to a processor 109 which controls server operation and an I/O interface 108 for receiving document requests and suppling documents in response to received requests. Via the interface 108 documents are supplied over the communications network 115 to user devices 110 and 120 via communication links 128, 230 respectively. User device 110, 120 may be in a variety of forms. For example, user device 110 is a cell phone while user device 120 may be and sometimes is a desktop computer, notepad device, laptop or another computing device which includes a web browser and/or other application that can be used to retrieve and process applications in accordance with the invention.

Figure 2:
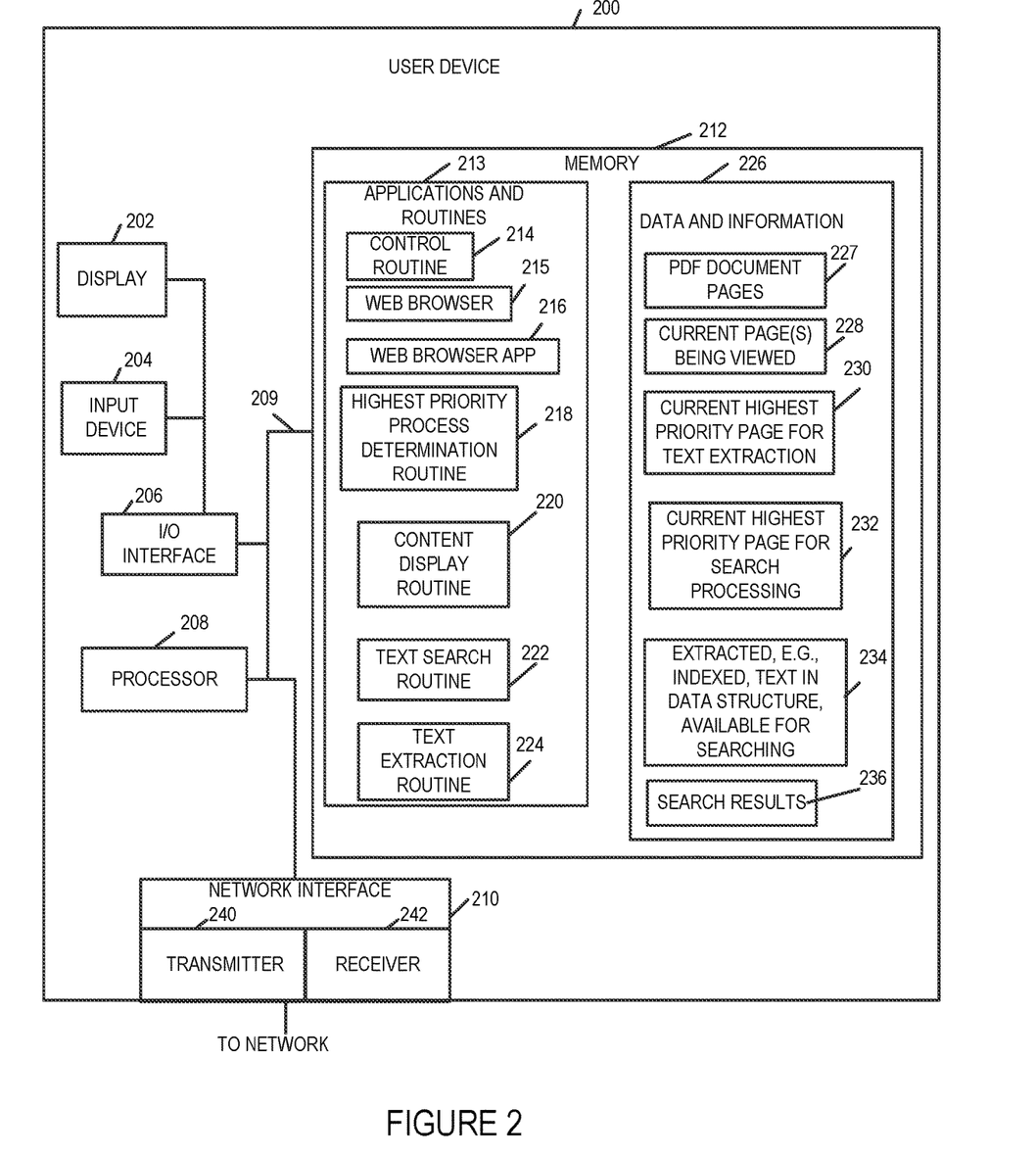
FIG. 2 shows an exemplary user device which implements an exemplary method of supporting document retrieval, display, text retrieval and search operations in accordance with one exemplary embodiment of the present invention.

FIG. 2 shows an exemplary user device 200 which can be used as any one of the user devices 110, 120 shown in FIG. 1. User device 200 implements an exemplary method of supporting document retrieval, display, text retrieval and search operations in accordance with one exemplary embodiment of the present invention. The method will be discussed in further detail with reference to the flow charts included in some of the other figures of the present application. The exemplary user device 200 may be a cell phone, laptop computer, desktop computer, note pad device or other computing device capable of receiving and processing PDF document contents in accordance with the invention.

The exemplary user device 200 includes a display 202, input device 203 which are coupled to an I/O interface 206, The input device 204 can be, for example, a keyboard and/or mouse which can be used by a user of the device 202 to select content, e.g., PDF documents for retrieval, enter scroll or page change commands, provide search input such as text words and/or to input a command or select a displayed option to initiate a search or retrieval of a document. The I/O interface 206 is coupled by bus 209 to processor 208, memory 212 and network interface 210. The network interface includes a transmitter 240 for sending document requests and other information, e.g., to network 115 and server 102 and a receiver 242 for receiving one, more or all pages of a requested document. Document requests that are made by a user in some embodiments are presumed to request retrieval, loading and display of pages from the start of a requested document unless the user provides a starting page. If a starting page, e.g., corresponding to a chapter or portion of document of interest is indicated with a user provided document retrieval request, page retrieval and display will begin at the specified page with other pages being retrieved subsequently.

The bus 209 allows document pages, commands and other information to be communicated between the components coupled to the bus 209. The memory 212 includes applications and routines 213 and data/information 226. The applications and routines 213 include computer executable instructions which, when loaded into the processor 208, are executed and used by the processor 208 to control operation of the user device in accordance with the invention. Data and information 226 stored in the memory 212 includes retrieved document data and other information which can be used by the applications and routines and/or displayed to a user of the device 200.

The applications and routines 213 include a control routine 214 which controls the user device to implement the method of the present invention by loading and executing one or more of the other routines and applications stored in the memory 212. The applications and routines 218 further includes a web browser 215. The applications and routines 213 also include a web browser application 216 which in some embodiments implements java script based PDF document retrieval, display, searching and text extraction operations in accordance with the invention. The web browser application 216 may, and sometimes does, make calls to a highest priority process determination routine 218, a content display routine 220, a text search routine 222 and a text extraction routine 224. The text extraction routine 224 in some embodiments is implemented using a publicly available PDF.JS function or subroutine which can extract text from a portion of a PDF document when called. In some embodiments, one or more or all of the highest priority process determination routine 218, a content display routine 220, a text search routine 222 and a text extraction routine 224, are included as part of the web browser application 216. For example, the web browser application 216 includes a main routine which implements the steps of flowchart 400, and one or more subroutines which implement the steps of one or more or all of flowcharts 500, 600, 700 and 800. The web browser application 216 maybe and sometimes is a java script based application.

In addition to the various routines which will be discussed further with regard to the flow charts shown in other figures, the memory includes various data and information. The data/information includes retrieved PDF document pages 227, e.g., pages retrieved from server 102 in response to a user document request entered into the web browser 216, which can be processed and displayed in accordance with the invention, information indicating the current page or pages being viewed 228, information indicating the current highest priority page for text extraction 230, a current highest priority page for search processing 232, extracted document text which is available for searching 234 and search results 236. Search results may be and sometimes are used to highlight, e.g., user color highlighting, text found in a user requested search which is currently being displayed.

Figure 3:
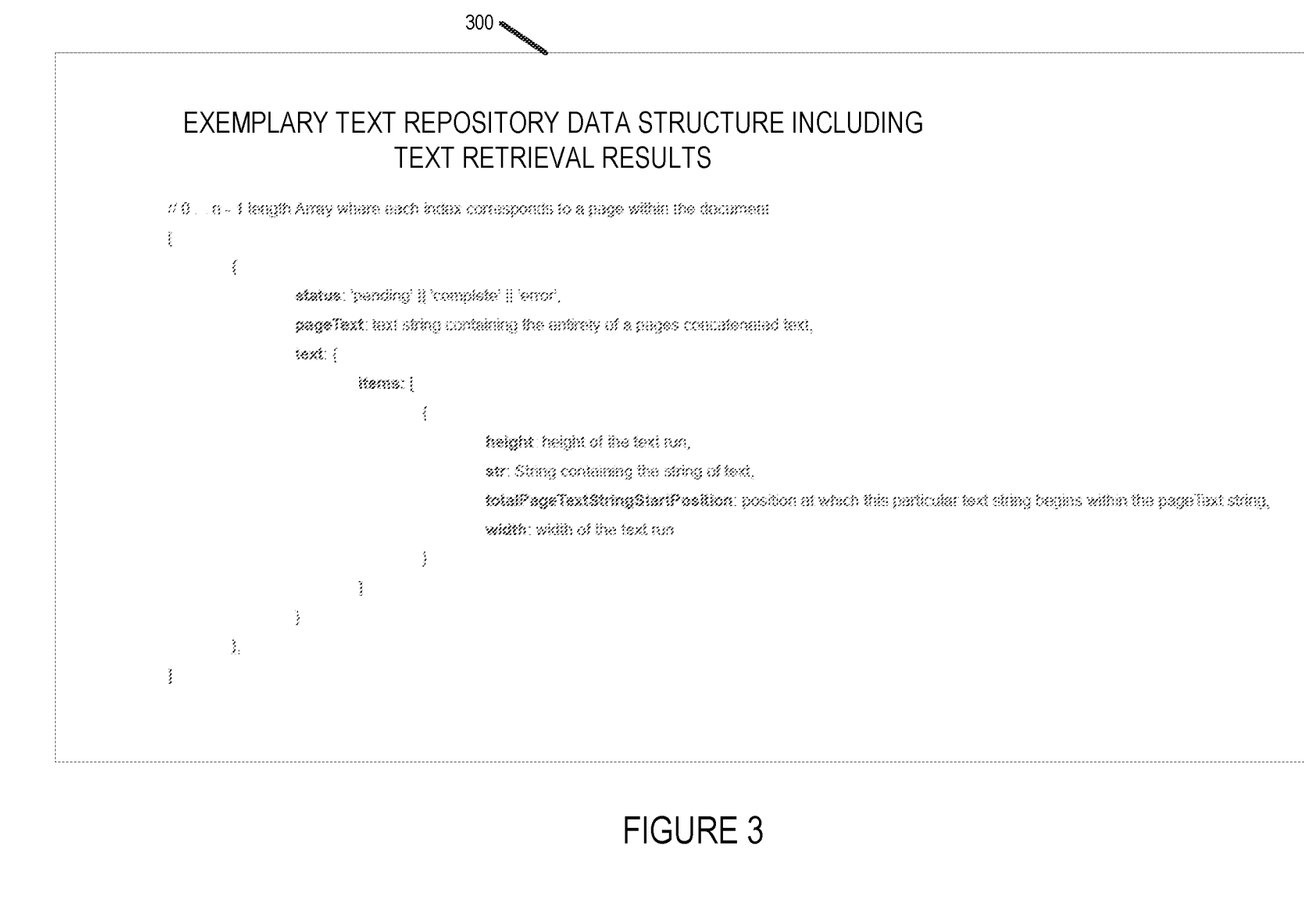
FIG. 3 shows a data structure for storing document text retrieval results and for supporting text searching in accordance with the invention.

FIG. 3 shows an exemplary text retrieval data structure in which retrieved text results are supported. The retrieved text is stored in the data structure 300 using indexed strings to store the retrieved text. Each string includes text corresponding to a different page. When text of a page is to be searched, the string identified by the string index number corresponding to the text page to be searched is accessed and the search performed for the user provided search terms or works. Results of the text search for a given page are stored in search results portion 236 of memory 212 and used to highlight the text corresponding to the search when the corresponding page is displayed. This may involve highlight with yellow, for example, the search terms identified on a page as the result of the search.

The strings included in data structure 300 for a particular document can be added to the data store 300 at different times a text is extracted from a portion of a page or from multiple pages of a document. Thus, while the data structure 300 will be empty when pages are initially retrieved, as text is extracted the text corresponding to the pages will be stored in the data structure 300 with viewed pages being given priority for text extraction and storage over pages which the user is not viewing at a given time. Given enough time, in some embodiments the full text of a document which was retrieved will be extracted and stored in the data structure 300 and saved as long as the corresponding PDF pages are stored. Thus, even before a user initiates the text search, one or more pages will likely have been extracted and stored to facilitate future searches of one or more pages of a document.

Figure 4:
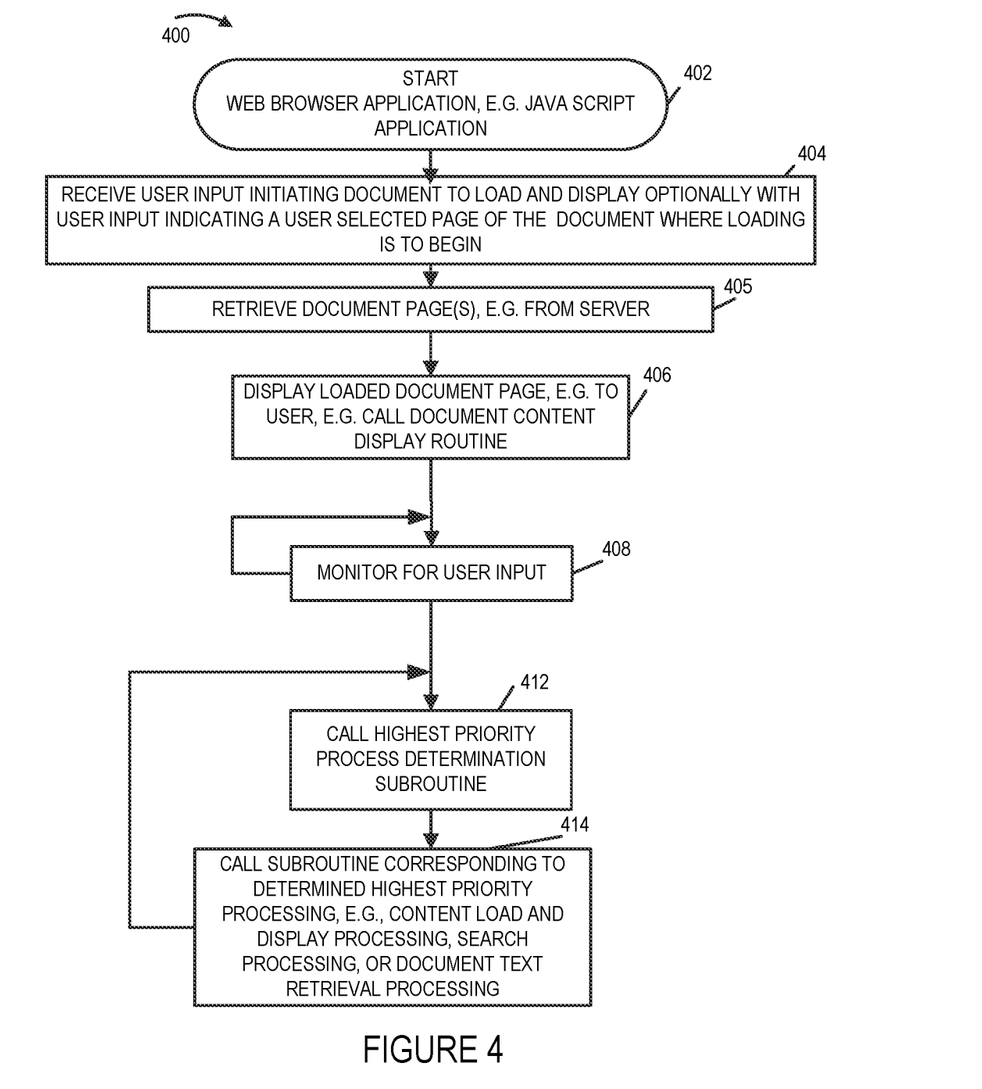
FIG. 4 is a flow chart showing the steps of a web browser application, e.g., a JAVA Script application, which supports PDF content, e.g., document, retrieval, display, text extracting and searching in accordance with an exemplary embodiment.

FIG. 4 is a flow chart showing the steps 400 of a web browser application, e.g., a JAVA Script application, which supports PDF content, e.g., document, retrieval, display, text extracting and searching in accordance with an exemplary embodiment. While in various embodiments one or more routines and applications are implemented using a JAVA script, this is not a critical feature of the invention and the page retrieval, text extraction and operation prioritization can be used for applications implemented in a wide range of languages. However, it should be appreciated that many of the benefits of the exemplary method are particularly noticeable where processing operations for multiple functions or routines need to be implemented sequentially which is generally the case in application implemented using a single processing thread or processor core.

The browser method 400 shown in FIG. 4, which supports PDF document, retrieval and searching begins in start step 402 when the application is loaded into the processor 208 of the user device implementing the method of the invention and beings being executed. Operation proceeds from stat step 402 in which user input indicating a document, e.g., a PDF document, to load and display is received from a user. This may involve selecting a document for retrieval from a set of Internet search results or a list of available documents. In some cases, the user optionally indicates where document retrieval should begin in terms of a page of the document, e.g., corresponding to a chapter or portion of interest. In cases where a starting page is not specified page retrieval begins at the start of the document, e.g., page 1 and proceeds until the full document is retrieved. Loading and display of pages in step 406 commences once the page content is received, e.g., from the server 102 and loaded into memory.

Figure 7:
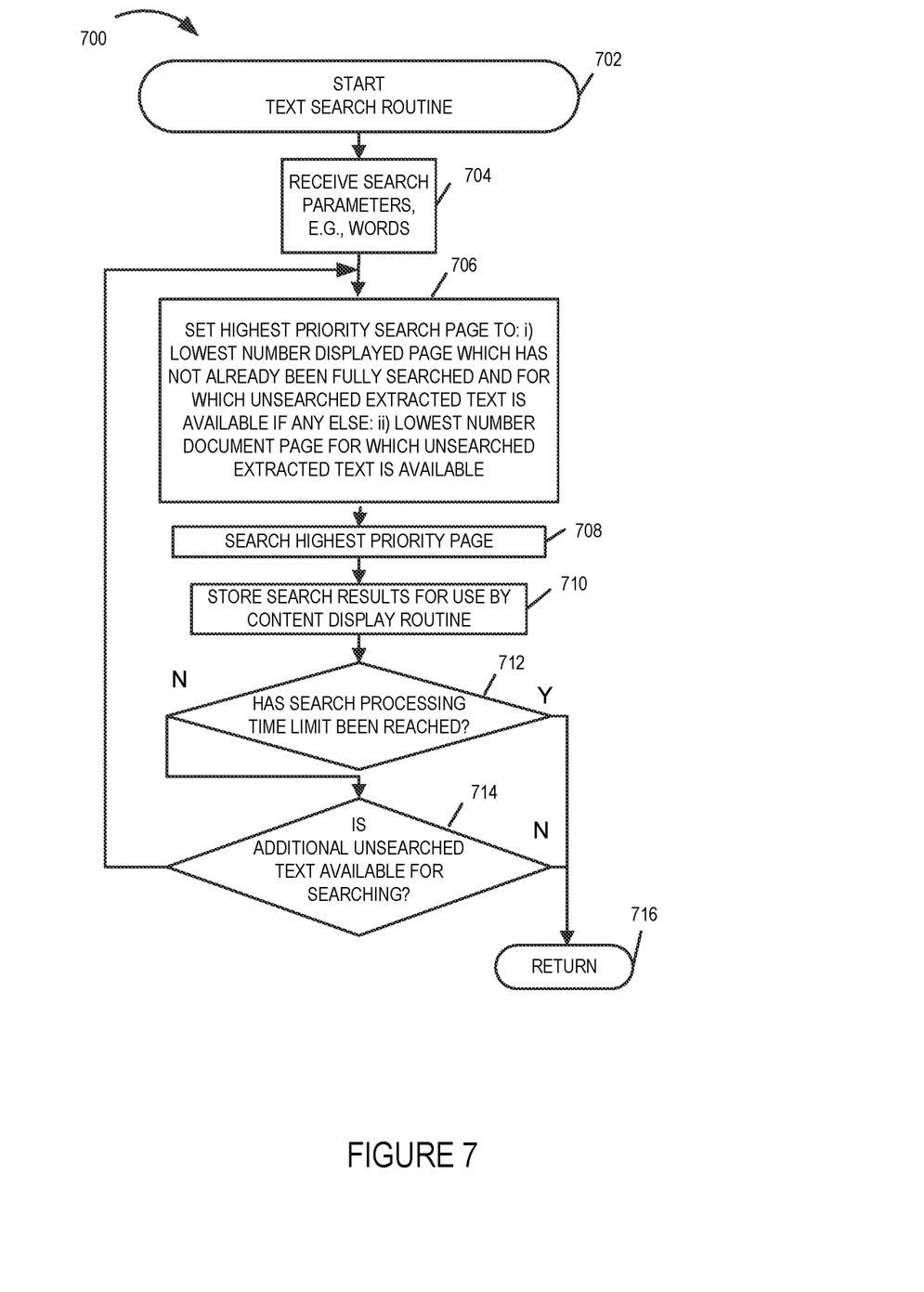
FIG. 7 is a flow chart of a text search routine that can be called by the web browser application of FIG. 4.

The loading and display of a document page in step 406 may and sometimes does involve a call to document content display routine 220. The steps 400 of an exemplary document display subroutine, which may be bused as the routine 220, are shown in FIG. 7 which will be discussed further below.

With a document page having been displayed to a device user in step 406 operation proceeds to step 408 in which the user device 200 monitors for user input. This may involve scroll command, page jump commands and/or search commands which may be received and stored by the I/O interface 206 until the processor 208 is ready to process the user input. While the processor may be temporally occupied with other processing operations such as text retrieval from one or more PDF documents, processing is prioritized and arranged into small time periods so that a user will perceive, in most cases, a lag between entry of a command and scroll operation and the user device taking an action in response to the entered command or search request.

While user input is monitored and stored on an ongoing basis by I/O interface 206, operation is shown as proceeding from step 408 to step 412 to show that processor processing operations are not restricted by the monitoring for user input and that other processing operations can be implemented by the processor 109 even while a user provides input which is detected and buffered by the I/O interface 206 for use in later processing.

In step 412 a call is made to a highest priority process determination subroutine to determine what process the processor 109 should dedicate available processing resources to. The prioritization of processing resources, used for different operations or functions for small period of time, allows the processor 206 to serially perform various operations in small time intervals without precluding a response to user input with a reasonable amount of time, in less than a few seconds, and within 200 ms, in some cases. Operation proceeds from the highest priority process determination step 412 to step 414 in which a call is made to a subroutine corresponding to the determined highest priority processing operation to be performed given the current user input, displayed pages and/or already retrieved document text. The call to the subroutine which implements the determined highest priority operation will result in the corresponding processing being performed, e.g., content display processing, text extraction processing and/or search processing. The processing implemented by the called processing subroutine in step 414 takes only a small amount of time, e.g., under two seconds in some embodiments and under 200 ms in most embodiments. Once the processing implemented by the subroutine which is called is completed, operation proceeds to step 412 so that a new processing determination can be made. By repeatedly re-prioritizing among the different processes based on user input and the results of previous processing, a user can be provided a responsive user experience with search results being promptly returned even though the processing relating to document page text retrieval and processing are limited to processing implemented sequentially by a single processor, processor core or using a single processing thread of a processor capable of supporting multiple processing threads but which are not used in parallel for or by the web browser application 216.

Various routines, also sometimes referred to as subroutines, which can be called by the web browser application 216 when implementing the steps shown in FIG. 4 will now be described with reference to FIGS. 5 through 8.

Figure 5:
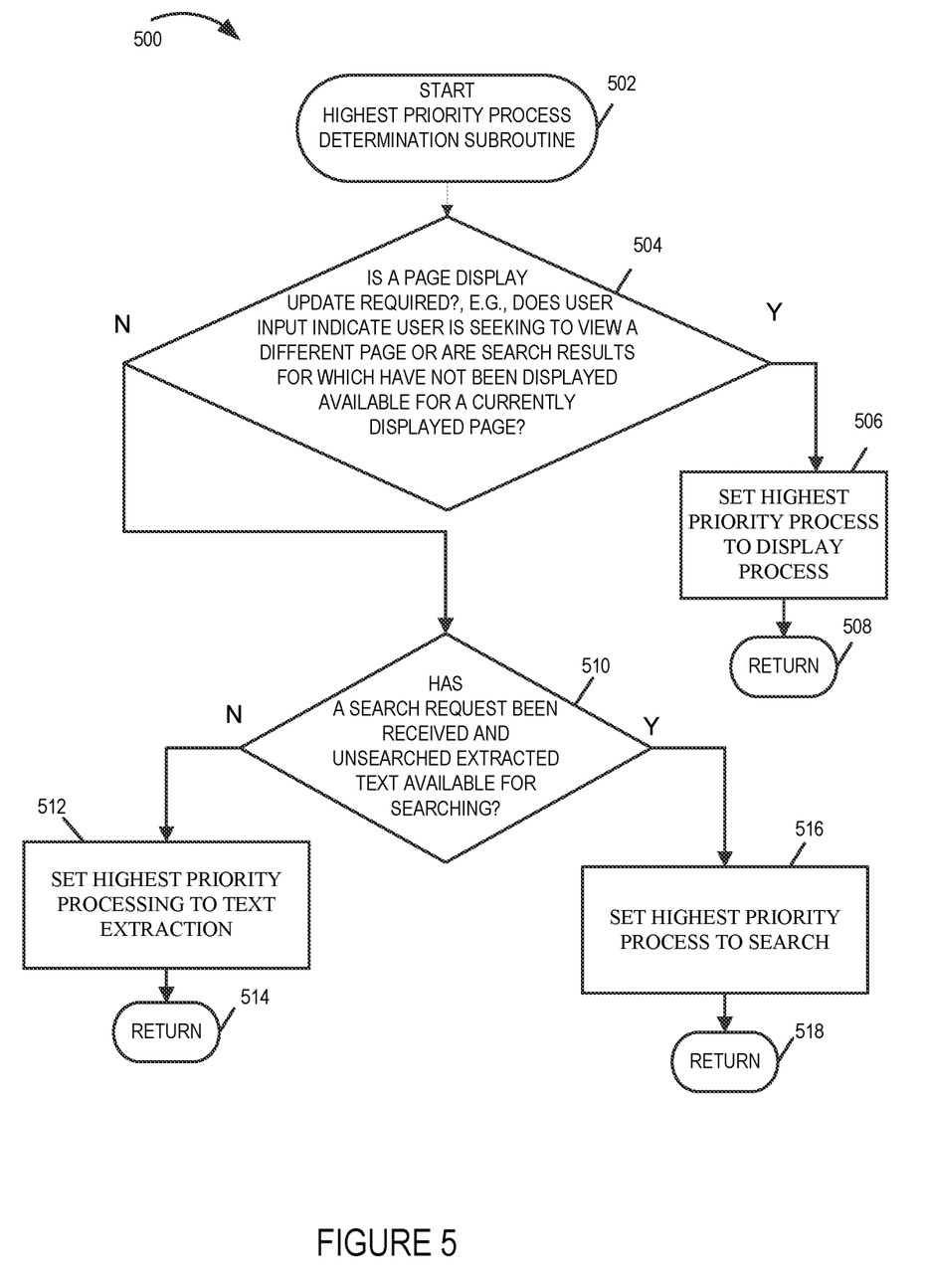
FIG. 5 is a flow chart of a highest priority process determination routine that can be called by the web browser application of FIG. 4.

FIG. 5 is a flow chart showing the steps 500 of a highest priority process determination routine 218, that can be called by the web browser application 216, in step 412 of FIG. 4. The highest priority process determination subroutine begins in start step 502 in response to the routine being called. The process has as inputs user input such as whether an unprocessed scroll request or page change request has been received as user input, whether there are search results available for a displayed page which have not been displayed, the pages from which text has already been extracted and whether there is an outstanding search request that needs to be completed among other things.

Operation proceeds from start step 502 in which input information is received and/or accessed to step 504. In step 504 a determination is made if a page display update is required. A page updated is determined to be required if there is an uncompleted scroll or page change command from the user or search results available for a displayed page which have not already been incorporated into the displayed page and thus shown to the user. In step 540 if it is determined that a page display update is required, operation proceeds to step 506 where the highest priority process is designated to be the display process. This determination is communicated in return step 508 back to the application which called the routine shown in FIG. 5 so that the display process subroutine will be called.

By giving a high priority to updating the displayed page or pages with user requested changes and/or search results the user is provided with a browser experience that makes the user feel that browser is being response to his/her inputs or search requests even though all the search results may not be available at the time display update is first made following a search request.

In step 504 if it is determined that a display update is not required, operation proceeds to step 510 in which a decision is made as to whether search processing operations should be given priority over text extraction processing operations. Searching of extracted text is usually a relatively fast operation and is useful in providing results which can be displayed to the user even if the results need to be updated as additional text becomes available for searching. Accordingly, searching is normally given higher priority than text extraction to provide a high quality user experience despite limited processing resources. As should be appreciated, there is no reason to give search processing priority if there is no unsearched text available for searching.

In step 510 a determination is made as to whether a search request has been received and unsearched extracted text is available for processing. If the answer is yes, operation proceeds from step 510 to step 516 in which search processing is designated as the highest priority process. The designation and determination of search processing as the highest priority processing is communicated back to the routine which called the process prioritization routine in return step 518.

If in step 510 it is determined that a search request was not received and thus no search request is pending, or that there is no extracted unsearched text from the document whose pages are being displayed to search operation proceeds to step 512 in which text extraction processing is determined to be the highest processing priority. Operation proceeds from step 512 to return step 514 in which the designation and determination of text extraction processing as the highest priority processing is communicated back to the routine which called the prioritization subroutine shown in FIG. 5.

Once a highest priority process has been determined by a call to the prioritization routine shown in FIG. 5, the method of FIG. 4 in step 414 calls the subroutine shown corresponding to the highest priority process.

Figure 6:
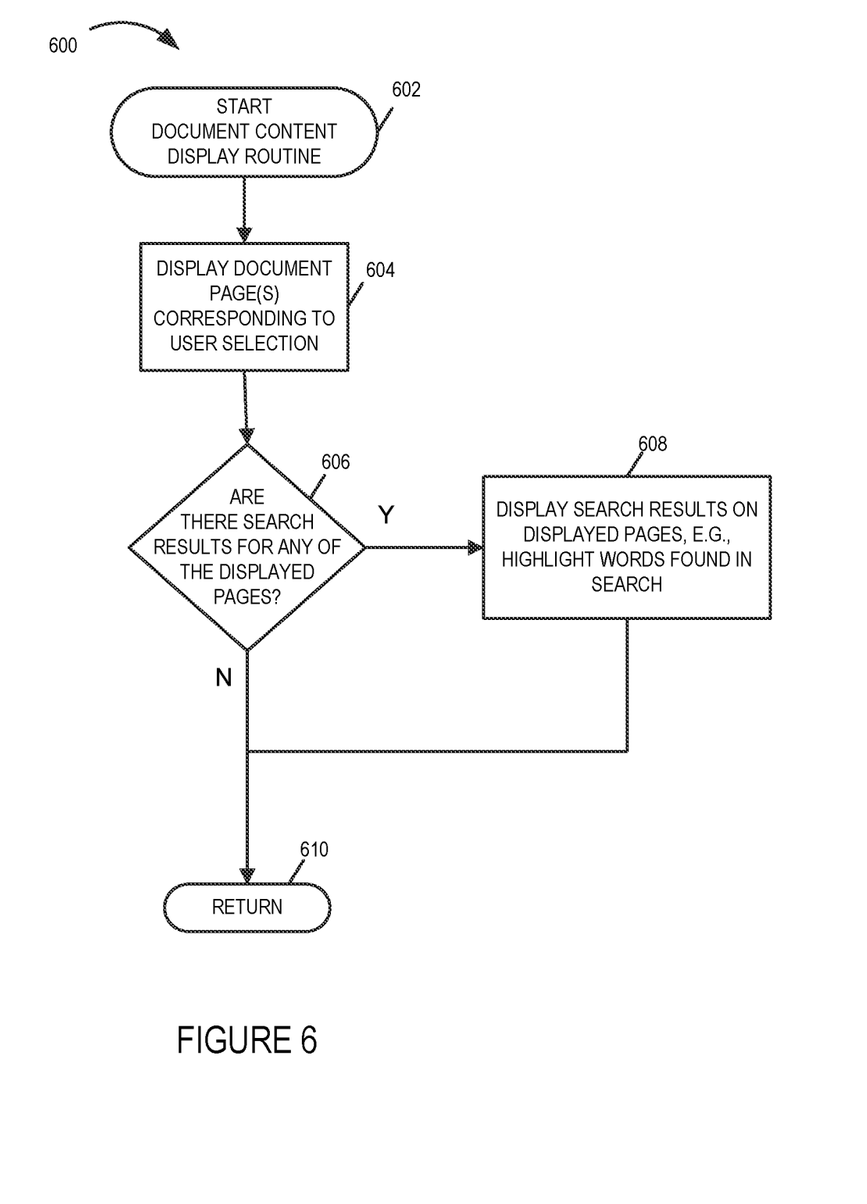
FIG. 6 is a flow chart of a document content display routine that can be called by the web browser application of FIG. 4.

The document content display routine 600 shown in FIG. 6 will be called in step 414 in response to display processing having been determined to be the current highest priority process.

The document content display routine 600 shown in FIG. 6 starts in step 602 when called from step 414. Operation then proceeds to step 604 content corresponding to a user selection is displayed. This may involve displaying of a newly retrieved and loaded page such as the first page of a document following retrieval of the page in response to document selection and/or continuation display of a previously displayed page if no user input requiring change of the displayed page or pages, such as scroll or go to page command was received. In step 604 if a scroll or go to page command was received the new user selected page as indicated by the received user input will be displayed.

Operation proceeds from step 604 to step 606 in which a check is made to determine if there are any search results to be displayed. If no search results are available for display operation returns via step 610 so that another process prioritization operation can be performed and processing can continue.

In various embodiments, when available, search results are displayed on top of or with a displayed page. If in step 606 it is determined there are search results to be displayed, operation proceeds from step 606 to step 608 in which the search results are displayed on top of or with the displayed page or pages. For example, terms or words identified by a search that are included in the pages being displayed are highlighted, e.g., using color and/or other visual markings such as underlining to show their location in the displayed page or pages. With the available search results for the pages being displayed being shown in step 608 operating returns and the prioritization process shown in FIG. 4 can be called to determine the next routine to be called.

Having described the display content subroutine shown in FIG. 6, we will now turn to discussing the text search processing routine 700 shown in FIG. 7 which starts in step 702 when called by the browser application shown in FIG. 4.

Operation proceeds from start step 702 to step 704 in which search parameters, e.g., words and are phrases provided by a user, are provided to the search routine as input. Then in step 706 the highest priority page to be searched is determined. In step 706 the lowest number displayed page for which extracted text is available is determined to be the highest priority page for search purposes. If there is no displayed page for which unsearched text is available, the lowest number document page for which unsearched extracted text is available will be designated as the highest priority search page. Thus, for search purposes displayed pages are given priority over pages which are not displayed.

Operation proceeds from page prioritization step 706 to search step 708 in which the highest priority page is searched. Then in step 710 the search results are stored. Operation then proceeds to step 712. While search processing on previously extracted text is relatively quick in some embodiments, the amount of time allowed for searching is limited, e.g., to 50 ms, so that the user can be quickly provided search results. In step 712 a determination is made is the search processing time limit has been reached. If in step 712 it is determined that a processing time limit has not been reached operations proceeds to step 714. In step 714 a check is made to determine if additional unsearched extracted text is available for searching. If additional unsearched text is available for searching, operation returns to step 706 so that pages for which unsearched extracted text is available can be prioritized so that searching can continue.

However, if in step 714 it is determined that there is no additional extracted text available for searching, operation proceeds to return step 716. Similarly, if in step 712 it is determined that the search processing time limit has been reached, operation proceeds to return step 716. In return step 716 where search results are returned and processing moves on to processing prioritization step 412 so that what processing should be performed next can be determined.

Figure 8:
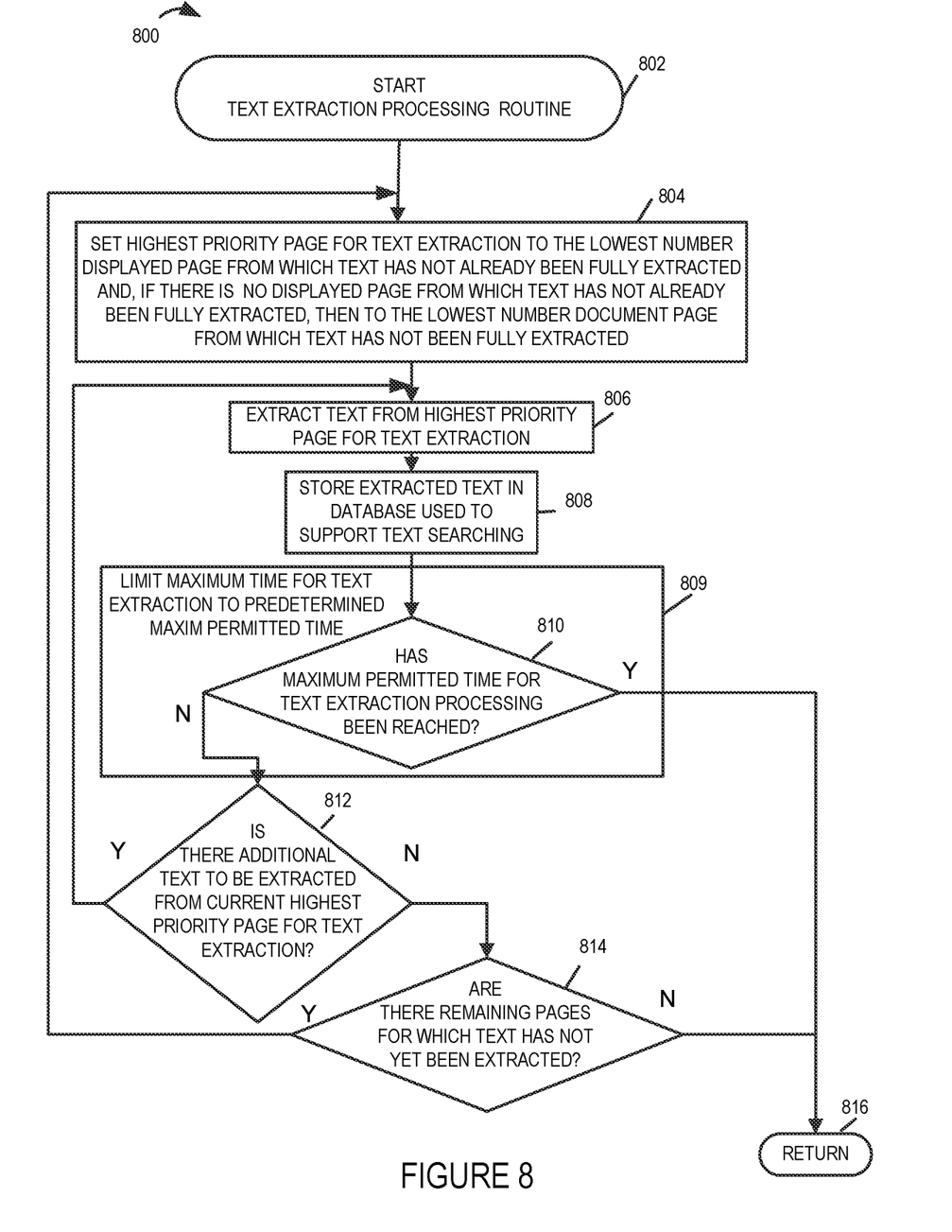
FIG. 8 is a flow chart of a text extraction processing routine that can be called by the web browser application of FIG. 4.

FIG. 8 is a flow chart of a text extraction processing routine that can be called by the web browser application of FIG. 4. Text extraction processing is performed on portions of pages with an extraction processing time limit being checked after a portion of text is extracted. This is because text extraction can be time consuming making it desirable to limit the processing in some cases to extracting text from a portion of a page before other processing may be performed. From a user interface perspective this can be desirable since it avoids the potential risk that text extraction for an extended period of time gives the user the impression that the application has hung up or crashed. As part of the text extraction process, extraction of text from one or more displayed pages is given priority over text extraction from pages which are not being displayed. As the pages which are displayed over time change, the text extraction priority will change. Assuming text has been fully extracted from displayed pages, text is then extracted from the lowest number page from which text has not already been extracted with extraction then proceeding in some embodiments to higher number pages in page order. Extracted text is stored and used to support searches when search requests are made.

The steps of the text extraction routine shown in FIG. 8 will now be described in detail. Processing starts in step 802 when the text extraction routine is called by the routine of FIG. 4. In step 804 pages including unextracted text are prioritized for purposes of text extraction. The highest priority page for text extraction is set to the lowest number displayed page from which text has not already been fully extracted and, if there is no displayed page from which text has not already been fully extracted, then the highest priority page for text extraction is set to the lowest number document page from which text has not already been fully extracted.

With the page on which extraction is to be performed having been determined in step 804, operation proceeds to step 806. In step 806 text is extracted from the highest priority page for text extraction. Step 806 may be implemented by a function call to a known or standard PDF text extraction function. A portion of the text found on a page may be extracted by the function call made in step 806.

Operation proceeds from step 806 to step 808 in which the extracted text is stored in memory, e.g., in a data structure such as the one shown in FIG. 3. Operation proceeds from storage step 808 to extraction time processing limitation step 809 which includes in some embodiments time check step 810. In extraction time processing step 809 the maximum time for which text extraction is limited to a predetermined maximum amount of time. In some embodiments this amount of time is less than 1 second. In some cases it is even shorter, e.g., 200 ms, 100 ms or 50 ms depending on the particular embodiments. By limiting the maximum amount of time for text extraction performed during a given call to the text extraction processing routine, an opportunity to re-prioritize possible processing operations is performed which can and sometimes does result in other operations being performed such as a search and/or display update. In this way the web browser application does not give the user the impression of being frozen, locked or non-responsive even though it might take seconds to extract the text from the entire document with the extraction being performed in some cases through multiple calls to the text extraction processing routine 800 shown in FIG. 8.

In step 810 a check is made if the maximum permitted time for text extraction processing has been reached. In some embodiments this maximum time is less than 200 ms and in some embodiments is less than 100 ms and in particular embodiments is 50 ms or less.

If in step 810 it is determined that the maximum permitted time for text extraction processing has not been reached, operation proceeds to step 812. As noted above, the extraction process of step 806 may extract a portion of the text on a page. In step 812 a check is made if there is additional text to be extracted from the current highest priority page for text extraction purposes. If there is additional text to be extracted from the current highest priority page, operation returns to extraction step 806. However, if in step 812 it is determined that there is no additional text in the current highest priority page to be extracted, operation proceeds to step 804 so that a new highest priority page for extraction purposes can be determined. Thus, through sequential processing operations text is extracted from pages based on page priority which can change over time based on such things as what text has already been extracted and/or what page is being displayed.

In step 810 it is determined that the maximum permitted time for text extraction processing has been reached, operation proceeds to return step 816. Thus, even if all the text on a page has not been extracted, to avoid excessive delays with regard to returning at least some results, operation will proceed to return step 816 once the maximum permitted extraction time period has been reached from the start of the call to the text extraction processing routine and thus the start of a particular text extraction processing time interval.

If in step 814 it is determined that there were no more pages for which text has not yet been extracted, e.g., that the text from all the document pages were extracted, operation proceeds to return step 816. Thus, operation returns from the text extraction routine 800 upon the expiration of the extraction processing time limit or completion of text extraction from all pages of the document.

Upon return from the text extraction processing routine, a determination as to the next process to be implemented will be made in processing prioritization step 414.

As should be appreciated by limiting various processing time periods and prioritizing not only what process is performed at a given time but also what page or pages are processed, a greatly improved user experience can be provided as compared to applications which initiate full extraction of text from all pages of a PDF document before proceeding with a search or presenting text search results.

Numerous variations on the above described methods and apparatus are possible and the possible maximum time limits are intended to be exemplary and not necessarily limiting or required for all embodiments.

NUMBERED LIST OF EXEMPLARY METHOD EMBODIMENTS

Method Embodiment 1. A method of operating a device including a processor and display to provide document content to a user, the method comprising: retrieving (405) document pages from a server; displaying (406) one or more pages on the display; monitoring for user input (408); prioritizing (412) between processing operations including at least a content display related processing operation, a content search processing operation and a document text retrieval operation to determine a highest priority processing operation; and initiating processing (414) (e.g., call subroutine) corresponding to the determined highest priority processing operation.

Method Embodiment 2. The method of Method Embodiment 1, wherein prioritizing (412) between processing operations (shown in FIG. 5) includes: determining (504) if a page update display is required (e.g., because or a scrolling or page change request or because search results are available for display).

Method Embodiment 3. The method of Method Embodiment 2, further comprising: in response to determining a page display update is required, setting (506) the content display related processing operation as the highest priority processing operation.

Method Embodiment 4. The method of Method Embodiment 3, wherein initiating processing (414) (e.g., call subroutine) corresponding to the determined highest priority processing operation includes: calling a document content display routine (600) in response to the content display processing operation being set as the highest priority processing operation.

Method Embodiment 5. The method of Method Embodiment 4, further comprising: operating (606) the content display routine to determine that search results are available for a displayed page; and displaying (608) the search results on the displayed page.

Method Embodiment 6. The method of Method Embodiment 2, wherein prioritizing (412) between processing operations (shown in FIG. 5) further includes: determining (510) if a search request has been received and unsearched extracted text is available for searching.

Method Embodiment 7. The method of Method Embodiment 6, wherein prioritizing (412) between processing operations (shown in FIG. 5) includes: in response to determining that a search request has been received and unsearched extracted text is available for searching, setting (516) a search processing operation as the highest priority processing operation.

Method Embodiment 8. The method of Method Embodiment 7, wherein initiating processing (414) (e.g., call subroutine) corresponding to the determined highest priority processing operation includes: calling a text search routine (700) in response to the search processing operation being set as the highest priority processing operation.

Method Embodiment 9. The method of Method Embodiment 6, wherein prioritizing (412) between processing operations (shown in FIG. 5) includes: in response to determining that a search request has not been received or that unsearched extracted text is not available for searching, setting (512) a text extraction operation as the highest priority processing operation.

Method Embodiment 10. The method of Method Embodiment 1, wherein prioritizing (412) between processing operations (shown in FIG. 5) includes: setting (512) a text extraction operation as the highest priority processing operation.

Method Embodiment 11. The method of Method Embodiment 10, wherein initiating processing (414) (e.g., call subroutine) corresponding to the determined highest priority processing operation includes: calling a text extraction routine (800) in response to the text extraction processing operation being set as the highest priority processing operation.

Method Embodiment 12. The method of Method Embodiment 11, further comprising: operating the text extraction routine to determine (804) a highest priority document page for text extraction based on at least what page or pages are being displayed; and extracting text (806) from the highest priority page; and storing (808) the extracted text in a data structure in a storage device to support text searching of the document.

Method Embodiment 13. The method of Method Embodiment 12, wherein operating the text extraction routine to determine (804) a highest priority document page for text extraction based on at least what page or pages are being displayed includes prioritizing a displayed page document page over document pages which are not displayed for text extraction purposes.

Method Embodiment 14. The method of Method Embodiment 13, wherein operating the text extraction routine to determine (804) a highest priority document page for text extraction based on at least what page or pages are being displayed includes setting the lowest number displayed page from which text has not already been fully extracted as the highest priority page for text extraction.

Method Embodiment 15. The method of Method Embodiment 14, wherein operating the text extraction routine to determine (804) a highest priority document page for text extraction based on at least what page or pages are being displayed includes setting the lowest number page which is not a displayed page and from which text has not already been fully extracted as the highest priority page for text extraction when there is no displayed page from which text has not been fully extracted.

Method Embodiment 16. The method of Method Embodiment 15, further comprising: limiting (810) the amount of time text extraction that is performed prior to re-prioritizing processing operations to a maximum predetermined amount of time for text extraction processing.

Method Embodiment 17. The method of Method Embodiment 16, wherein maximum predetermined amount of time for text extraction processing is less than 1 second.

Method Embodiment 18. The method of Method Embodiment 16, wherein maximum predetermined amount of time for text extraction processing is less than 200 ms (milliseconds) (and in some cases 50 ms or less).

Method Embodiment 19. The method of Method Embodiment 16, wherein the processor uses a single processing core to implement the recited steps.

Method Embodiment 20. The method of Method Embodiment 15, wherein the processor is controlled by a java script implemented web browser application that uses a single processing thread to control the device to implement the recited steps.

NUMBERED LIST OF EXEMPLARY APPARATUS EMBODIMENTS

Apparatus Embodiment 1. A user device (110, 120 or 200) comprising: a network interface (210) configured to receive pages of a PDF document (106) via a communications network (115); memory (212) including a web browser application (216) including processor executable instructions; and a processor (208) coupled to said memory (212), said processor (208) being configured to execute the processor executable instructions in said web browser application to control the user device to perform, under the direction of the processor executable instructions the steps of: retrieving (405) document pages from a server (102); displaying (406) one or more pages on a display (202); monitoring for user input (408); prioritizing (412) between processing operations including at least a content display related processing operation, a content search processing operation and a document text retrieval operation to determine a highest priority processing operation; and initiating processing (414) (e.g., call subroutine) corresponding to the determined highest priority processing operation.

Apparatus Embodiment 2. The user device (110, 120 or 200) of Apparatus Embodiment 1, wherein said web browser application (216) is a java script application.

Apparatus Embodiment 3. The user device (110, 120 or 200) of Apparatus Embodiment 2, wherein said processor (208) is configured to use a single processor core included in said processor (208) to implement the instructions included in the web browser application (216).

Numbered List of Exemplary Non-Transitory Processor

READABLE MEDIUM EMBODIMENTS

Non-Transitory Processor Readable Medium Embodiment 1.

A non-transitory processor readable storage device (212) including processor executable instructions which when executed by a processor (208) of a device (110, 120 or 200), control the device (110, 120, or 200) to: retrieve (405) document pages from a server; display (406) one or more pages on a display; monitor for user input (408); prioritize (412) between processing operations including at least a content display related processing operation, a content search processing operation and a document text retrieval operation to determine a highest priority processing operation; and initiate processing (414) (e.g., call subroutine) corresponding to the determined highest priority processing operation.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above-described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above-described methods. Accordingly, among other things, various embodiments are directed to a computer readable medium including computer executable instructions for causing a machine, e.g., processor or computer system, to perform one or more of the steps of the above-described method(s). Each of the steps of the method may be, and sometimes, are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments, the image processing device is a desktop computer. In some embodiments the image processing device is a portable device, e.g., a laptop computer, handheld computer, tablet computer, smart phone, personal data assistant, etc., with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of operating a device including a processor and display to provide document content to a user, the method comprising:
   retrieving document pages from a server;
   displaying one or more pages on the display;
   monitoring for user input;
   prioritizing between processing operations including at least a content display related processing operation, a content search processing operation and a document text retrieval operation to determine a highest priority processing operation; and
   initiating processing corresponding to the determined highest priority processing operation.

2. The method of claim 1, wherein prioritizing between processing operations includes:
   determining if a page display update is required.

3. The method of claim 2, further comprising:
   in response to determining a page display update is required, setting the content display related processing operation as the highest priority processing operation.

4. The method of claim 3, wherein initiating processing corresponding to the determined highest priority processing operation includes:
   calling a document content display routine in response to the content display processing operation being set as the highest priority processing operation.

5. The method of claim 4, further comprising:
   operating the document content display routine to determine that search results are available for a displayed page; and
   displaying the search results on the displayed page.

6. The method of claim 2, wherein prioritizing between processing operations further includes:
   determining if a search request has been received and unsearched extracted text is available for searching.

7. The method of claim 6, wherein prioritizing between processing operations includes:
   in response to determining that a search request has been received and unsearched extracted text is available for searching, setting a search processing operation as the highest priority processing operation.

8. The method of claim 7, wherein initiating processing corresponding to the determined highest priority processing operation includes:
   calling a text search routine in response to the search processing operation being set as the highest priority processing operation.

9. The method of claim 6, wherein prioritizing between processing operations includes:
   in response to determining that a search request has not been received or that unsearched extracted text is not available for searching, setting a text extraction operation as the highest priority processing operation.

10. The method of claim 1, wherein prioritizing between processing operations includes:
    setting a text extraction operation as the highest priority processing operation.

11. The method of claim 10, wherein initiating processing corresponding to the determined highest priority processing operation includes:
    calling a text extraction routine in response to the text extraction processing operation being set as the highest priority processing operation.

12. The method of claim 11, further comprising:
    operating the text extraction routine to determine a highest priority document page for text extraction based on at least what page or pages are being displayed;
    extracting text from the highest priority page; and
    storing the extracted text in a data structure in a storage device to support text searching of the document.

13. The method of claim 12, wherein operating the text extraction routine to determine a highest priority document page for text extraction based on at least what page or pages are being displayed includes prioritizing a displayed page document page over document pages which are not displayed for text extraction purposes.

14. The method of claim 13, wherein operating the text extraction routine to determine a highest priority document page for text extraction based on at least what page or pages are being displayed includes setting the lowest number displayed page from which text has not already been fully extracted as the highest priority page for text extraction.

15. The method of claim 14, wherein operating the text extraction routine to determine a highest priority document page for text extraction based on at least what page or pages are being displayed includes setting the lowest number page which is not a displayed page and from which text has not already been fully extracted as the highest priority page for text extraction when there is no displayed page from which text has not been fully extracted.

16. The method of claim 15, further comprising:
    limiting the amount of time that text extraction is performed prior to re-prioritizing processing operations to a maximum predetermined amount of time for text extraction processing.

17. The method of claim 16, wherein maximum predetermined amount of time for text extraction processing is less than 1 second.

18. The method of claim 16, wherein maximum predetermined amount of time for text extraction processing is less than 200 ms.

19. The method of claim 16, wherein the processor uses a single processing core to implement the recited steps.

20. The method of claim 15, wherein the processor is controlled by a java script implemented web browser application that uses a single processing thread to control the device to implement the recited steps.

21. A user device comprising:
a network interface configured to receive pages of a PDF document via a communications network;
memory including a web browser application including processor executable instructions; and
a processor coupled to said memory, said processor being configured to execute the processor executable instructions in said web browser application to control the user device to perform, under the direction of the processor executable instructions the steps of:
retrieving document pages from a server;
displaying one or more pages on a display;
monitoring for user input;
prioritizing between processing operations including at least a content display related processing operation, a content search processing operation and a document text retrieval operation to determine a highest priority processing operation; and
initiating processing corresponding to the determined highest priority processing operation.

22. The user device of claim 21, wherein said web browser application is a java script application.

23. The user device of claim 22, wherein said processor is configured to use a single processor core included in said processor to implement the instructions included in the web browser application.

24. A non-transitory processor readable storage device including processor executable instructions which when executed by a processor of a device, control the device to:
retrieve document pages from a server;
display one or more pages on a display;
monitor for user input;
prioritize between processing operations including at least a content display related processing operation, a content search processing operation and a document text retrieval operation to determine a highest priority processing operation; and
initiate processing corresponding to the determined highest priority processing operation.

* * * * *